United States Patent Office 2,876,087
Patented Mar. 3, 1959

2,876,087

COATED ABRASIVES

Charles S. Webber, Loudonville, N. Y., assignor to Norton Company, Troy, N. Y., a corporation of Massachusetts No Drawing. Application February 27, 1957
Serial No. 642,672

8 Claims. (Cl. 51—298)

This invention relates to coated abrasive, particularly those products wherein a paper, cloth, or other sheet material is adhesively coated with abrasive grains.

An object of my invention is to provide a flexible coated abrasive article utilizing a modified phenol formaldehyde resin whereby a more durable and efficient product is obtained.

Another object of my invention is to provide a superior adhesive for use in the manufacture of abrasive products.

In the cutting and abrading, particularly of steel, iron, or other tough, hard materials, the adhesive used to hold the grains must form a strong bond to the backing and to the grain, must be mechanically tough, and must be relatively resistant to the high temperatures involved in such cutting and abrading. Synthetic thermosetting resins such as phenol formaldehyde condensation products have been used extensively and have been generally satisfactory in such applications. I have found however that, by suitably modifying with o-chlorophenol the standard phenol formaldehyde resin used in coated abrasive products, an improved product with respect to cutting life and percent cut can be achieved.

In carrying out my invention the o-chlorophenol may be added to the phenol-formaldehyde bonding resin by one or more methods, as follows:

(1) The o-chlorophenol may be added to the phenol formaldehyde at the start of the initial condensation either as the raw product or as a water soluble phenoxide, i. e. sodium o-chlorophenoxide; the o-chlorophenol is soluble in phenol but is not soluble in appreciable quantities in aqueous formaldehyde solutions such as formalin except as a phenoxide of an alkaline radical; however, the phenol retains the o-chlorophenol in the formalin and its retention in solution is aided by the alkaline catalyst used in the reaction;

(2) The o-chlorophenol may be reacted, separately from the phenol and formaldehyde, under alkaline conditions with formalin (or, if desired, with paraform or any of the other formaldehyde polymers which will evolve formaldehyde); the condensation product thus formed may then be added to the phenolic coating resin in any desired proportions to yield the superior quality coated abrasives; since o-chlorophenol condensates are limited in water dilutability, to employ them in phenol-aldehyde resins which are extensively diluted with water requires the addition of a solvating agent such as sodium phenoxide or the addition of an alkaline hydroxide to form hydrophilic groups on the polymer;

(3) The o-chlorophenol may be added to the phenolic resin as a soluble phenoxide of an alkaline earth or alkali metal or as an ammonium compound or derivatives thereof; the sodium o-chlorophenoxide may or may not enter into a condensation reaction with the phenolic resin on curing at elevated temperatures to a thermoset condition; it is however believed to co-condense with the methylol phenols when the ratio of formaldehyde is in excess of about 1.4 molal to the phenol in the resin.

From the above, it may be seen that the o-chlorophenol may be added to the phenol-aldehyde reaction mixture at any point short of gelation, whereupon the said phenolic resin is no longer fluid and therefore not coatable under normal conditions.

*Example I*

An example of the preparation of o-chlorophenol modified phenol formaldehyde resin is as follows:

To 800 parts by weight (9.9 mols) of formaldehyde solution (37%) were added 470 parts by weight (5 mols) of phenol (U. S. P.), 64 parts by weight of o-chlorophenol, and 15 parts by weight of a 50% aqueous solution of sodium hydroxide. The above ingredients were mixed in a resin reactor fitted with a reflux condenser, a motor stirrer, and a heating jacket. The reaction was brought to 72° C. in one hour and was held at approximately this temperature (68 to 76° C.) for 5½ hours. It was then cooled to room temperature and held overnight before reheating to 74° C. in 1¼ hours and then held to 72° to 74° C. for 6 additional hours. The water tolerance of the resin reaction mixture at 30° C. was found to be 3.1 cc. per 10 grams. The reaction vessel was then evacuated for 2½ hours to a final temperature of 34° C. at 27 mm. vacuum. The condensate recovered was 480 grams, the yield was 837 grams having a solids content of 79.4%. The viscosity at 77° F. was found to be 7,500 centipoises and the final water tolerance 2.5 cc. per 10 grams at 30° C.

*Example II*

An example of the preparation of an o-chlorophenol formaldehyde condensation product is as follows:

In a 1½ liter reaction vessel fitted with a reflux condeneser and a mechanical stirrer were mixed 256 grams (2 mols) of o-chlorophenol, 325 grams (4 mols) of formalin (37%), and 25 grams of sodium hydroxide. The mixture was heated to 73° C. in ¾ of an hour and held at 70 to 74° C. for 3½ hours. The product was then vacuum distilled for ¾ of an hour at 19 mm. of vacuum.

*Example III.—Coated abrasive*

The product of Example I was formulated for coating on 30 mil vulcanized fiber for bonding grit 24 fused aluminum oxide grain as follows:

|   | G. |
|---|---|
| Resin of Example I | 120 |
| Sodium phenoxide tetrahydrate | 9.7 |
| Calcium carbonate | 200 |
| Water | 25 |

The calcium carbonate filler material conformed to the particle size range as taught in U. S. Patent No. 2,322,156 to Nicholas E. Oglesby.

The mixture was then coated on the fibre backing at 100° F. with a doctor clearance of 0.010 inch and the abrasive particles were uniformly coated on the resin in the amount of 89 to 95 lbs. per ream. The maker coat was then cured at a slow rate to avoid flow until a satisfactory bond resulted that would resist loss of grit and disorientation of the grain on passing through the sizing calenders. The maker solution was then diluted with water to a viscosity of 2750 centipoises at 100° F. and was used to size the abrasive grain. The product was then cured until thoroughly thermoset through a graduated curing cycle to avoid flow, the final cure step requiring 2 hours at 225° F.

*Example IV.—Coated abrasive*

The product of Example II was utilized in the following manner to produce coating for bonding grit 24 fused aluminum oxide on 30 mil vulcanized fiber:

| | Grams |
|---|---|
| The resin of Example II | 12.7 |
| Liquid phenol formaldehyde resin (conventional coated abrasive grit holding adhesive) | 100.0 |
| Sodium hydroxide | 9.1 |
| Calcium carbonate (filler) | 164.7 |
| Water | 24.4 |

A coated abrasive was made using this material as the maker coat and size coat in the manner specified in Example III.

Example V.—Coated abrasive

The o-chlorophenol, in the form of sodium o-chlorophenoxide may be added to the completed but uncured phenol formaldehyde resin before it is coated as an adhesive on the paper, fiber or cloth backing, as in the following example.

To 110 grams of a conventional coated abrasive grit holding alkaline catalyzed, water dilutable liquid phenolic resin of 72% solids was mixed 10.6 grams of sodium o-chlorophenoxide. This mixture was diluted with 22.5 grams of water and 171.6 grams of ground calcium carbonate. The viscosity of this mixture at 74° F. was 8,818 centipoises and was used to coat 30 mil fibre in the same manner as in Example Ia.

Abrasive discs 9⅛" in diameter made according to Example III when run at 3,500 to 5,000 R. P. M. were found to cut 50% more steel than similarly tested and prepared products in which the o-chlorophenol was omitted. The product also showed a 38.3% improvement in the cutting like of the disc over that of the control.

The product prepared according to Example IV was similarly tested against a control in which the o-chlorophenol was omitted. This product showed a 25% increase in the quantity of steel cut over the unmodified control.

The product of Example V, used as 9⅛" diameter discs tested on a commercial disc sanding machine cut 18% more steel than a coated abrasive prepared in the same way but with the o-chlorophenol omitted.

The exact reason for the improved cutting performance of abrasive articles made with o-chlorophenol modified phenol resin adhesives is not known. However, I have found that the substitution of p-chlorophenol, p-bromophenol, 6 chloro-o-cresol, and 4 chloro-o-cresol modified resins gives inferior results.

Although, in my examples, I have illustrated a preferred product in which the molal ratio of o-chlorophenol to phenol is 0.1, such ratios may be varied and satisfactory results may be achieved with a ratio at least as low as 0.05, and satisfactory results have been achieved with a ratio of 0.4 (about 30 molal percent). Also, the component that I refer to as "phenol" may obviously be phenol itself, as in the various examples, or may be cresol, xylenol, and equivalent phenolic homologues and derivatives having at least one hydroxyl group in the molecule.

To compare the efficiency of the cutting performance of the o-chlorophenol modified phenol-formaldehyde resins when used as an adhesive on grit #24 aluminum oxide discs at various ratios to the phenol and at various formaldehyde ratios, the following results were obtained:

| Phenol | o-Chloro-phenol | Formaldehyde | Percent Cut Over Standard Phenol Formaldehyde Discs |
|---|---|---|---|
| 1 | .050 | 2.0 | 23 |
| 1 | .10 | 2.0 | 67 |
| 1 | .125 | 2.5 | 12 |

Although I have illustrated the use of formaldehyde as the aldehyde component of my novel adhesive resin, obviously equivalent aldehydes such as acetaldehyde, furfuraldehyde, butyraldehyde etc. may be used. For example, I may condense o-chlorophenol with acetaldehyde in the presence of an acid catalyst, add excess base to the resin thus formed and mix this resin with a phenol formaldehyde resin as in Example IV.

Although the examples I have given are all flexible coated abrasives, it is obvious that my improved resin may be used in producing other abrasive products such as bonded inflexible abrasives.

I claim:

1. A coated abrasive article comprising abrasive grains bonded to a backing by a phenol formaldehyde resin, the phenol components of said resin comprising o-chlorophenol and phenol, said o-chlorophenol component being present in the ratio of approximately 1/10 mol o-chlorophenol to each mol of phenol.

2. A coated abrasive article comprising abrasive grains bonded to a backing by a plurality of bonding layers at least one of said bonding layers comprising a phenol formaldehyde resin in which the phenol component consists of o-chlorophenol and phenol in a molal ratio of from about 0.05 to 0.4 mol of o-chlorophenol to each mol of phenol.

3. A coated abrasive article comprising abrasive grains bonded to a backing by a bond comprising an o-chlorophenol modified phenol formaldehyde resin, said modified resin being formed from the reaction product of a mixture comprising phenol formaldehyde resin and a water soluble phenoxide of o-chlorophenol, said phenoxide being added in the amount of from about 0.05 to 0.4 mol of phenoxide per mol of phenol.

4. A coated abrasive article comprising abrasive grains bonded to a backing by a coating comprising a cured resin formed from a mixture of phenol formaldehyde resin and o-chlorophenol formaldehyde resin, the o-chlorophenol to phenol molal ratio being in the range of approximately 0.05 mol to 0.4 mol of o-chlorophenol to one mol of phenol.

5. A coated abrasive article comprising abrasive grains bonded to a backing by a coating comprising a cured resin which is the reaction product of phenol, o-chlorophenol, and formaldehyde said o-chlorophenol to phenol being in the molal ratio of from about 1 to about 8 mols of o-chlorophenol to 20 mols of phenol.

6. A coated abrasive article comprising abrasive grains bonded to a backing by a phenol formaldehyde resin wherein the phenolic component includes between approximately 5 molal percent and 30 molal percent of o-chlorophenol.

7. An abrasive article comprising abrasive grains bonded by a phenol aldehyde type resin wherein o-chlorophenol accounts for about from 5 to 30% of the total molal quantity of phenolic components of the resin.

8. A coated abrasive article comprising abrasive grains bonded to a backing by a phenol aldehyde resin wherein o-chlorophenol accounts for about from 5 to 30% of the total molal quantity of phenolic components of the resin.

References Cited in the file of this patent

UNITED STATES PATENTS

| 2,360,376 | Van Epps | Oct. 17, 1944 |
| 2,362,274 | Hurst | Nov. 7, 1944 |
| 2,716,098 | Biedermann | Aug. 23, 1955 |
| 2,736,718 | Webber | Feb. 28, 1956 |